(12) United States Patent
Kim et al.

(10) Patent No.: US 7,407,636 B2
(45) Date of Patent: Aug. 5, 2008

(54) REFORMER FOR FUEL CELL SYSTEM AND METHOD OF MANUFACTURING REACTION SUBSTRATE USED FOR THE SAME

(75) Inventors: Ju-Yong Kim, Suwon-si (KR); Ho-Jin Kweon, Suwon-si (KR); Jae-Jeong Kim, Seoul (KR); Oh-Joong Kwon, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 143 days.

(21) Appl. No.: 11/123,345

(22) Filed: May 7, 2005

(65) Prior Publication Data

US 2005/0252081 A1 Nov. 17, 2005

(30) Foreign Application Priority Data

May 14, 2004 (KR) .................. 10-2004-0034212

(51) Int. Cl.
*B01J 19/00* (2006.01)
*B01J 8/04* (2006.01)

(52) U.S. Cl. ............... 422/198; 422/177; 422/211; 422/191; 422/190; 422/189; 422/188; 422/129; 48/61

(58) Field of Classification Search ........... 422/198; 429/34
See application file for complete search history.

(56) References Cited

U.S. PATENT DOCUMENTS 6,033,634 A * 3/2000 Koga .................. 422/198
2003/0022052 A1 * 1/2003 Kearl .................. 429/34

* cited by examiner

*Primary Examiner*—Alexa Neckel
*Assistant Examiner*—Kaity Handal
(74) *Attorney, Agent, or Firm*—Christie, Parker & Hale, LLP

(57) ABSTRACT

There is provided a reformer for a fuel cell system, the reformer comprising: a reforming unit having a reaction substrate in which a catalyst layer is formed in a plurality of flow channels for allowing fuel to flow and for generating hydrogen through a reformation reaction of the fuel using thermal energy. When viewing a cross-section perpendicular to the flow direction of the flow channels, the reaction substrate defines each flow channel by a bottom portion and a pair of wall portions extending from the sides of the bottom portion, and a joint between the bottom portion and the wall portion is formed in a rounded shape. There is also provided a method of manufacturing a reaction substrate used for a reformer for a fuel cell system, the method comprising: (a) preparing a substrate; (b) anisotropically etching the upper surface of the substrate and forming a channel pattern of which a bottom portion and a wall portion are perpendicular to each other; (c) isotropically etching the channel pattern and forming a flow channel of which the joints between the bottom portion and the wall portions are rounded; (d) forming a support layer on the surface of the flow channel; and (e) forming a catalyst layer on the support layer.

11 Claims, 10 Drawing Sheets

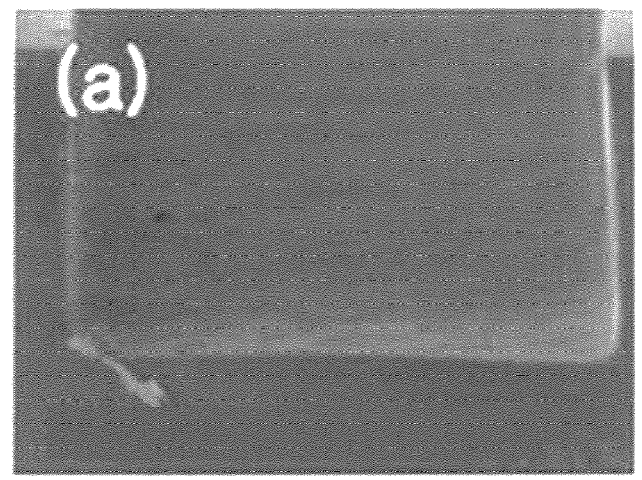
Fig.7a
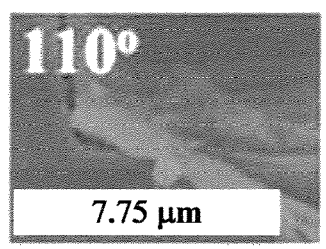 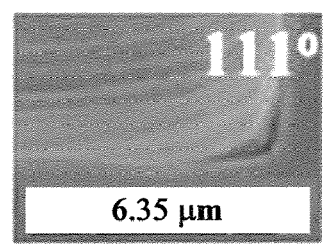
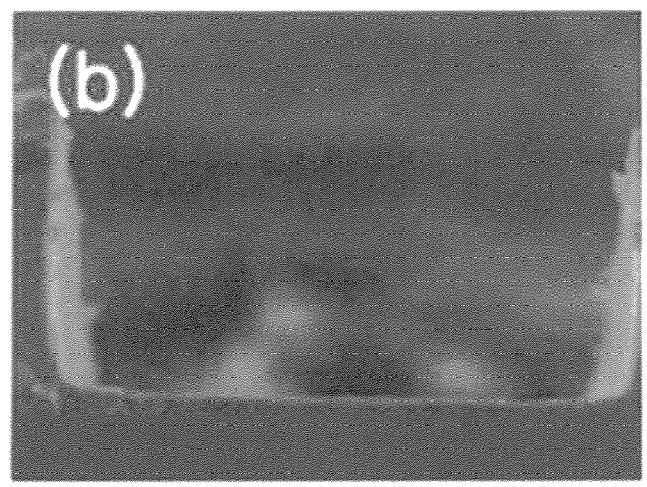
Fig.7b
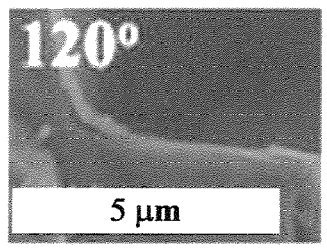 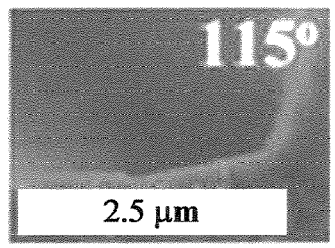

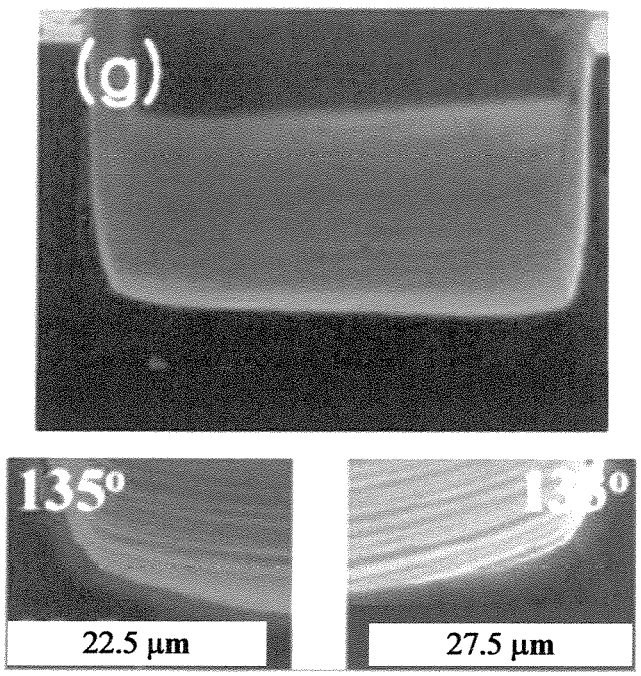
Fig.7g
Fig.8a
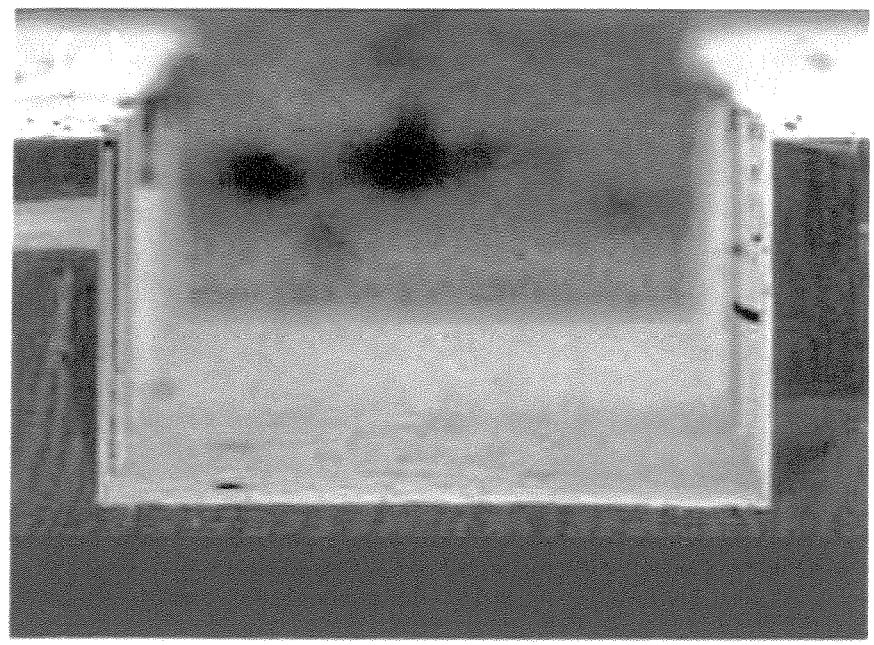

REFORMER FOR FUEL CELL SYSTEM AND METHOD OF MANUFACTURING REACTION SUBSTRATE USED FOR THE SAME

CROSS REFERENCE TO RELATED APPLICATION

This application claims priority to and the benefit of Korean Patent Application No. 10-2004-0034212 filed on May 14, 2004 in the Korean Intellectual Property Office, the entire content of which is incorporated herein by reference.

FIELD OF THE INVENTION

The present invention relates to a reformer for a fuel cell system and more particularly to a reformer comprising a reaction substrate.

BACKGROUND OF THE INVENTION

In general, a fuel cell is an electricity generating system that generates electric energy through an electrochemical reaction between oxygen and hydrogen or hydrogen contained in hydrocarbon materials such as methanol, ethanol, or natural gas.

A polymer electrolyte membrane fuel cell (hereinafter, referred to as PEMFC) has been developed recently which has excellent output characteristics, low operating temperatures, and fast starting and response characteristics. PEMFCs have a wide range of application including mobile power sources for vehicles, distributed power sources for home or buildings, and small-sized power sources for electronic apparatuses.

A fuel cell system employing the PEMFC scheme basically requires a stack, a reformer, a fuel tank, and a fuel pump. The stack constitutes an electricity generation unit and has a plurality of unit cells and the fuel pump supplies fuel from the fuel tank to the reformer. Then, the reformer reforms the fuel to generate hydrogen and supplies hydrogen to the stack.

The reformer generates hydrogen from the fuel through a catalytic chemical reaction using thermal energy. Therefore, the reformer comprises a heat source unit for generating the thermal energy and a reforming unit for generating hydrogen from the fuel using the thermal energy.

In a conventional reformer of a fuel cell system, since the heat source unit and the reforming unit are formed in a vessel shape and are connected to each other through pipes, the heat is not exchanged directly between the respective reaction units, thereby causing a disadvantage in thermal conduction. In addition, since the respective reaction units are separate, the system cannot be implemented compactly.

SUMMARY OF THE INVENTION

According to an embodiment of the present invention, a reformer for a fuel cell system is provided having a stacked structure of a plate type which can allow reactants including fuel to flow. Furthermore, a method is provided for manufacturing a reaction substrate for use in such a reformer.

According to an embodiment of the present invention, a reformer is provided for a fuel cell system, the reformer comprising: a reforming unit having a reaction substrate in which a catalyst layer is formed in one or more flow channels for allowing fuel to flow and for generating hydrogen from the fuel by a reformation reaction using thermal energy, wherein when viewing a cross-section of a flow channel perpendicular to the direction of flow, the reaction substrate has a bottom portion with a pair of wall portions extending from the sides of the bottom portion together forming a flow channel. Each flow channel further includes a joint between the bottom portion and each wall portion defining a circular arc or rounded shape.

In the reformer for a fuel cell system, the circular arc of the joint may have a radius of curvature ranging 10 to 20 $\mu$m. The angle defined by the bottom portion and each wall portion of a flow channel is generally an obtuse angle ranging, for example, from 120 to 130°.

In an embodiment of the reformer for a fuel cell system, the flow channels may be defined by a plurality of ribs protruding from one surface of the reaction substrate, the ribs separated from one another by a predetermined gap.

The reformer for a fuel cell system may further comprise a cover plate disposed in close contact with one surface of the reaction substrate.

In the reformer for a fuel cell system, a support layer for supporting the catalyst layer may be formed on the surface of the flow channel.

In the reformer for a fuel cell system, exemplary materials for the reaction substrate include silicon, glass, and stainless steel. The support layer may be made of a material such as alumina, silica, or titania.

The reformer of a fuel cell system may further comprise a heat source unit having a reaction substrate for the heat source unit similar to the reaction substrate for the reforming unit. The reaction substrate for the heat source unit defines a plurality of flow channels, each with a heat source catalyst layer. The heat source unit allows fuel and air to flow through the flow channels and generate thermal energy through an oxidation reaction. The reaction substrate for the heat source unit is disposed in close contact with the reforming unit.

The reformer of a fuel cell system may further comprise at least one carbon monoxide reducing unit similar to the reaction substrates for the reforming unit and the heat source unit. The carbon monoxide reducing unit defines a plurality of flow channels, each with a carbon monoxide reducing catalyst layer. The carbon monoxide reducing unit reduces the concentration of carbon monoxide contained in the hydrogen fed to the electricity generating unit and is in close contact with the heat source unit.

In the reformer for a fuel cell system, the reaction substrate for the reforming unit, the reaction substrate for the heat source unit, and the reaction substrate for the carbon monoxide reducing unit may be stacked and a cover plate may be disposed in close contact with the uppermost of the reaction substrate.

According to another aspect of the present invention, a method is provided for manufacturing a reaction substrate used for a reformer for a fuel cell system, the method comprising: (a) preparing a substrate; (b) anisotropically etching the upper surface of the substrate and forming a channel pattern of which a bottom portion and a wall portion are perpendicular to each other; (c) isotropically etching the channel pattern to form one or more flow channels with a rounded joint between the bottom portion and each wall portion of each flow channel; (d) forming a support layer on the surface of each flow channel; and (e) forming a catalyst layer on each support layer.

In the method of manufacturing a reaction substrate, the substrate may be made of a material such as silicon, glass, or stainless steel.

In the method of manufacturing a reaction substrate, the support layer may be made of a material such as alumina, silica, or titania.

In the method of manufacturing a reaction substrate, the flow channel may be formed such that the rounded joints each define a circular arc with a radius of curvature ranging from 10 to 20 μm.

In the method of manufacturing a reaction substrate, the flow channel may be formed such that an angle between the bottom portion and each wall portion ranges from 120 to 130°.

BRIEF DESCRIPTION OF THE DRAWINGS

The above and other features and advantages of the present invention will become more apparent by describing in detail exemplary embodiments thereof with reference to the attached drawings in which:

FIGS. 7a to 7g are a set of partially-enlarged photographs illustrating reaction substrates manufactured according to embodiments of the present invention;

FIGS. 8a to 8c are a set of partially-enlarged photographs illustrating reaction substrates manufactured according to comparative examples of the present invention;

DETAILED DESCRIPTION

Hereinafter, embodiments of the present invention will be described in detail with reference to the attached drawings, such that the embodiments can be easily put into practice by those skilled in the art. However, since the present invention can be embodied in various forms, the present invention is not limited to the embodiments described below.

Figure 1:
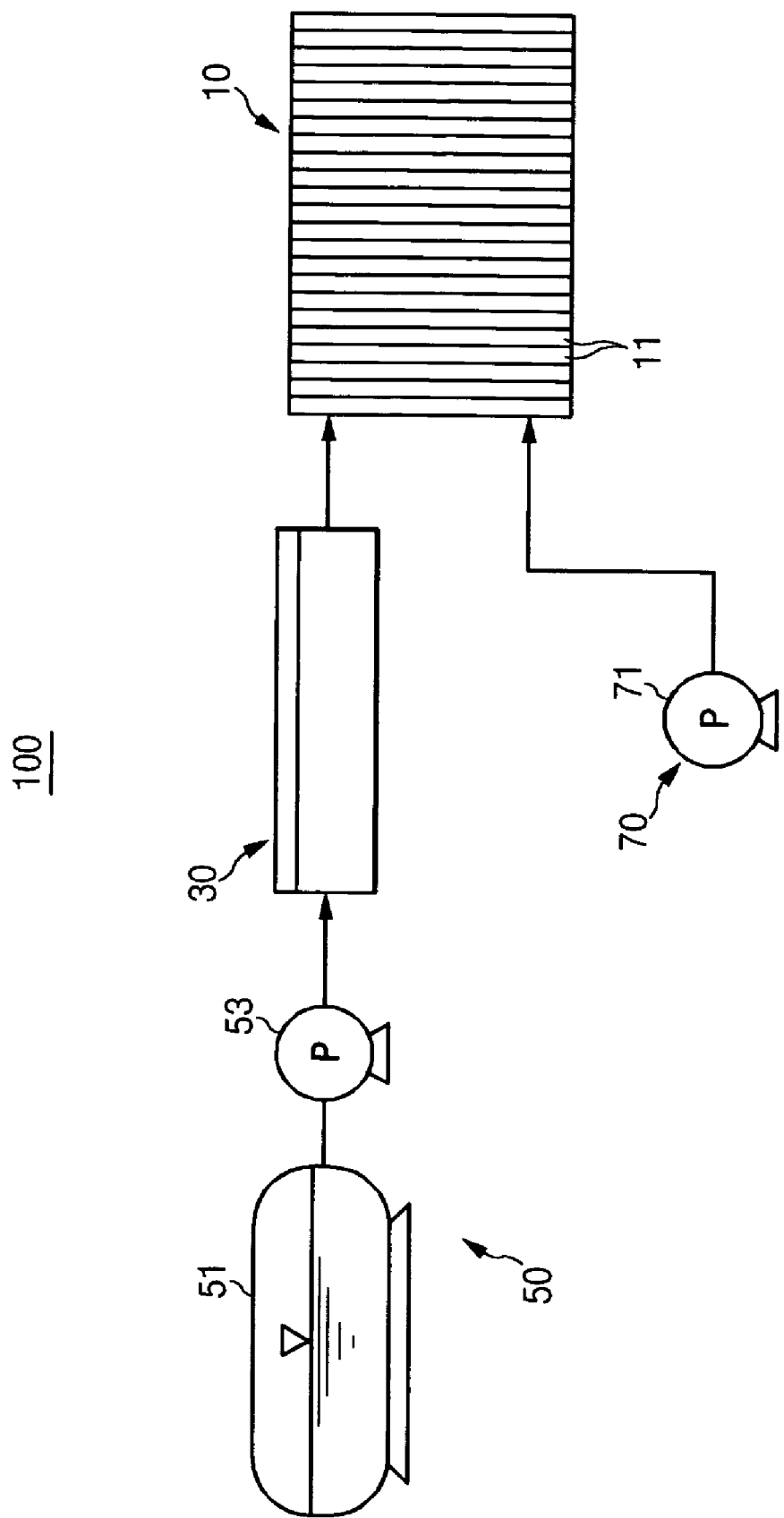
FIG. 1 is a block diagram schematically illustrating an entire construction of a fuel cell system according to the present invention.

FIG. 1 is a block diagram schematically illustrating an entire construction of a fuel cell system according to the present invention.

Referring to the figure, a fuel cell system 100 according to the present embodiment has a polymer electrode membrane fuel cell (PEMFC) scheme, which reforms fuel to generate hydrogen and allows hydrogen and oxygen to electrochemically react with each other to generate electric energy.

The fuel used for the fuel cell system 100 may include liquid or gas fuel containing hydrogen such as methanol, ethanol, natural gas, and the like. However, the fuel described below in the present embodiments is defined as liquid fuel for the purpose of convenience.

The fuel cell system 100 may utilize pure oxygen stored in an additional storage device for reacting with hydrogen or may utilize air containing oxygen as the necessary oxygen source. However, the latter is exemplified in the following description.

The fuel cell system 100 comprises a stack 10 for generating electric energy through a reaction between hydrogen and oxygen, a reformer 30 for reforming fuel to generate hydrogen to be supplied to the stack 10, a fuel supply unit 50 for supplying the fuel to the reformer 30, and an air supply unit 70 for supplying air to the stack 10.

The stack 10 comprises an electricity generating unit 11 which generates electric energy through an electrochemical reaction between hydrogen and oxygen. The electricity generating unit 11 is constructed as a unit fuel cell in which separators (also referred to as "bipolar plates" in the art) are disposed in close contact with both surfaces of a membrane-electrode assembly (MEA). Therefore, in the present invention, by sequentially stacking a plurality of electricity generating units 11, the stack 10 having a set of electricity generating units 11 can be formed. Since such a construction of the stack 10 is equivalent to the stack construction of a conventional PEMFC fuel cell, its detailed description will be omitted.

In the present embodiment, the reformer 30 has a structure for generating hydrogen from fuel through a reformation reaction of fuel using thermal energy, for example, a chemical catalytic reaction such as steam reformation, partial oxidation, and auto-thermal reaction. The structure of the reformer 30 will be described later in detail with reference to FIGS. 2 to 4.

The fuel supply unit 50 supplies fuel to the reformer 30 and comprises a fuel tank 51 for storing fuel and a fuel pump 53 with a conventional structure for discharging the fuel from the fuel tank 51.

The air supply unit 70 comprises an air pump 71 for drawing air from the atmosphere and supplying that air to the electricity generating units 11 of the stack 10 with a predetermined pumping power. In the present invention, the air supply unit 70 is not limited to the structure having the air pump 71, but may comprise a fan having a conventional structure, instead of the air pump 71.

Figure 2:
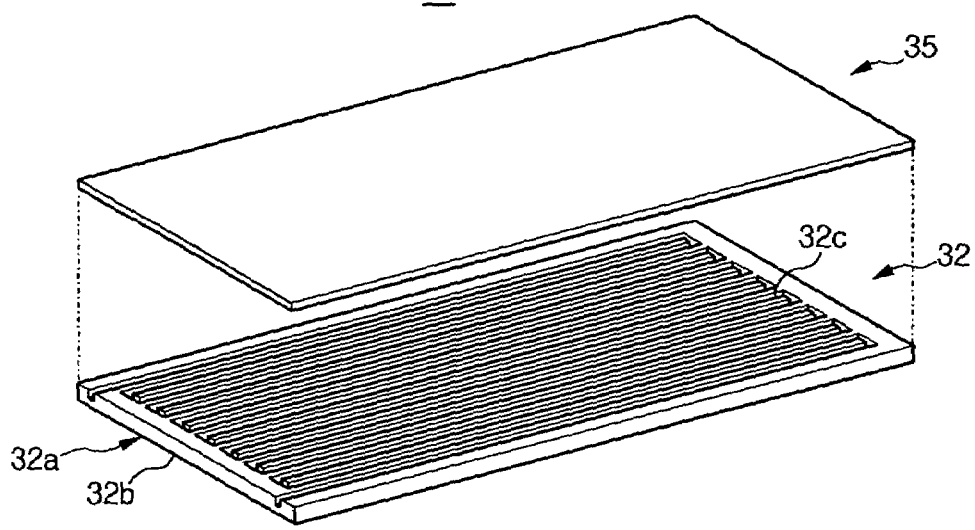
FIG. 2 is an exploded perspective view illustrating a structure of a reformer of a fuel cell system according to an embodiment of the present invention.
Figure 3:
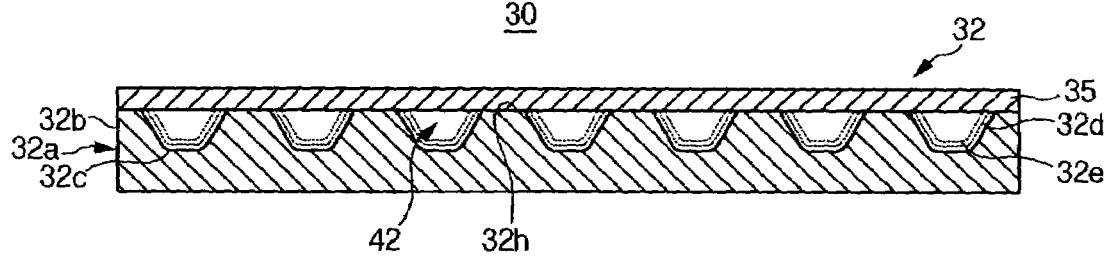
FIG. 3 is a cross-sectional view illustrating the coupled structure of the reformer of FIG. 2.

FIG. 2 is an exploded perspective view illustrating a structure of the reformer for a fuel cell system according to an embodiment of the present invention, and FIG. 3 is a cross-sectional view illustrating the coupled structure of FIG. 2.

Figure 4:
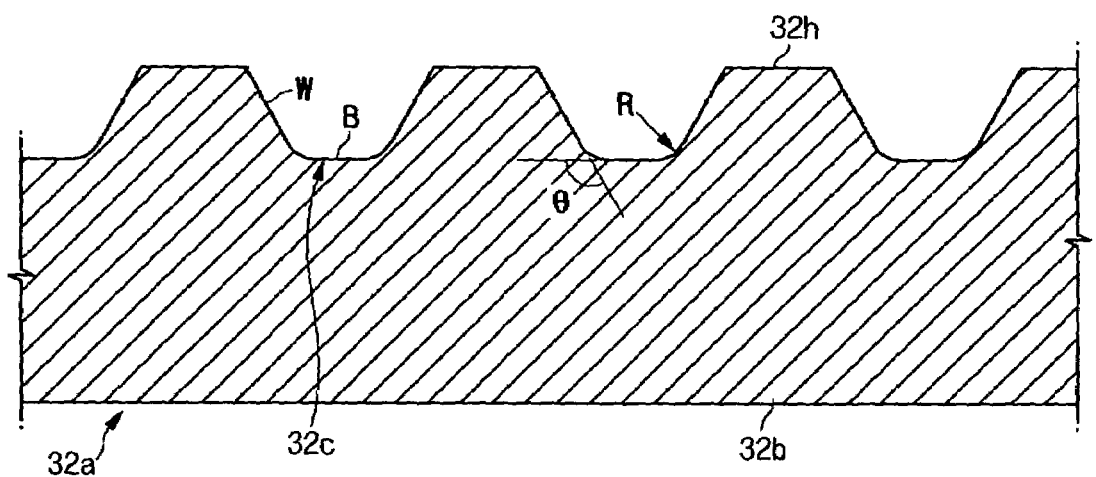
FIG. 4 is an enlarged cross-sectional view illustrating the flow channels of the reformer shown in FIG. 3.

Referring to FIGS. 2-4, the reformer 30 according to the present embodiment is provided as a reforming unit 32 of a plate type for generating hydrogen from fuel through a catalytic reforming reaction of the fuel using thermal energy.

The reforming unit 32 comprises a reaction substrate 32a for allowing the fuel to flow and for promoting the catalytic reforming reaction of the fuel and a cover plate 35 disposed in close contact with the reaction substrate 32a.

The reaction substrate 32a comprises a body 32b which defines a plurality of flow channels 32c allowing fuel to flow and a catalyst layer 32e formed in each flow channel 32c. The catalyst layer 32e can be formed by coating each flow channel 32c with a catalytic material for promoting a reformation reaction of fuel. A support layer 32d for supporting the catalyst layer 32e is provided between the surface of the flow channel 32c and the catalyst layer 32e.

The structure of the reaction substrate 32a will be described in more detail with reference to FIG. 4. The body 32b of the reaction substrate 32a has a rectangular plate shape having predetermined width and length and may be made of a material such as silicon, glass, or stainless steel.

In the reaction substrate 32a, the flow channel 32c may be defined by ribs 32h protruding from the upper surface of the body 32b with a predetermined gap. When viewing a cross-section of the flow channel 32c perpendicular to the length or the direction of flow, each flow channel 32c is defined by a bottom portion B and a pair of wall portions W forming the space between the ribs 32h. The flow channels 32c are disposed in parallel straight lines with a predetermined spacing between adjacent flow channels. According to this embodiment, adjacent flow channels are connected at the ends of the body 32b such that the plurality of flow channels together define a serpentine flow path 42. Of course, the arrangement of the flow channel 32c is not limited to such a configuration.

In the present embodiment, for each flow channel 32c, the bottom portion B and each wall portion W together define a rounded joint R with a circular arc. The rounded joint generally has a radius of curvature ranging from 10 to 20 μm. The flow channel 32c may also be formed such that the bottom portion B and each wall portion W together define an obtuse angle Θ ranging, for example, from 120° to 130°.

The support layer 32d supports the catalyst layer 32e with respect to the surface of the flow channel 32c. The support layer 32d may be formed on the surface of the flow channel 32c using a conventional sol-gel method and may be made of alumina ($Al_2O_3$), silica ($SiO_2$), or titania ($TiO_2$). The catalyst layer 32e may be formed on the support layer 32d using the sol-gel method.

The cover plate 35 is formed with a size corresponding to the reaction substrate 32a and comes in close contact with all the portions of the reaction substrate 32a other than the flow channel 32c. The cover plate 35 can be bonded to the reaction substrate 32c using known adhesion means. Therefore, by disposing the cover plate 35 in close contact with the upper surface of the reaction substrate 32a, the reforming unit 32 according to the present embodiment can form a flow passage 42 for fuel through each flow channel 32c.

When the fuel cell system 100 employing the reformer according to the above-mentioned embodiment of the present invention is activated, the fuel pump 51 supplies fuel to the flow passage 42 of the reforming unit 32. Then, the fuel flows through the flow passage 42. As a result, the reforming unit 32 generates hydrogen through a reformation reaction of fuel using the catalyst layer 32e.

When the hydrogen is supplied to the stack 10 and air is supplied to the stack 10 by the air pump 71, the electricity generating unit 11 of the stack 10 generates a predetermined amount of electric energy through a reaction between hydrogen and oxygen.

Figure 5:
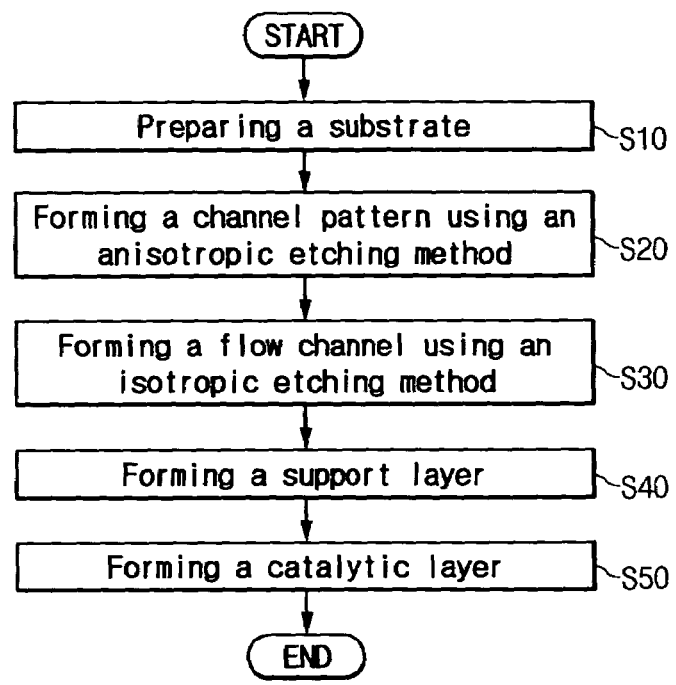
FIG. 5 is a flowchart illustrating a method of manufacturing a reaction substrate used for the reformer of a fuel cell system according to an embodiment of the present invention.

FIG. 5 is a flow chart illustrating a method of manufacturing a reaction substrate used for a reformer for a fuel cell system according to an embodiment of the present invention.

Referring to the figure, the method of manufacturing a reaction substrate used for the reformer for a fuel cell system according to the present embodiment includes preparing a substrate (S10); anisotropically etching the upper surface of the substrate and forming a channel pattern of which a bottom portion and a wall portion are perpendicular to each other (S20); isotropically etching the channel pattern and forming a plurality of flow channel from the channel pattern, each flow channel defining a pair of rounded joints, one between the bottom portion and each of the wall portion (S30); forming a support layer on the surface of the flow channel (S40); and forming a catalyst layer on the support layer (S50).

FIGS. 6a to 6e are cross-sectional views illustrating a method of manufacturing a reaction substrate used for a reformer for a fuel cell system according to an embodiment of the present invention.

Figure 6A:
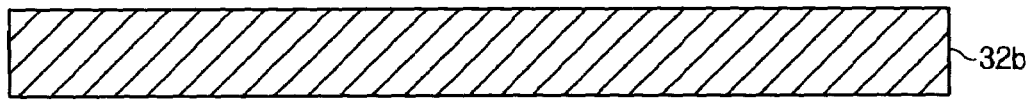
FIGS. 6a to 6e are views illustrating the method of manufacturing a reaction substrate used for the reformer of a fuel cell system according to an embodiment of the present invention.

Referring to FIG. 6a, for step S10, a substrate body 32b made of a material such as silicon, glass, or stainless steel is prepared.

Figure 6B:
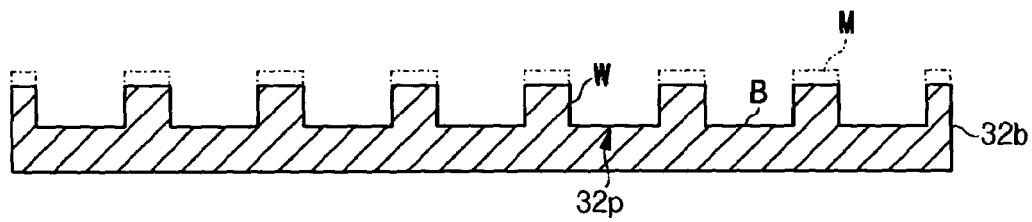

Referring to FIG. 6b, in step S20, a mask pattern M is formed on the upper surface of the substrate body 32b and then a channel pattern 32p having a width of 400 μm and a depth of 240 μm is formed by anisotropically etching the upper surface of the substrate body 32b. When viewing a cross-section of the channel pattern 32p perpendicular to the length direction, the channel pattern 32p has a bottom portion B and wall portions W extending from the sides of the bottom portion B with the joints between the bottom portion B and the wall portions W forming right angles due to the inherent characteristic of the anisotropic etching.

Figure 6C:
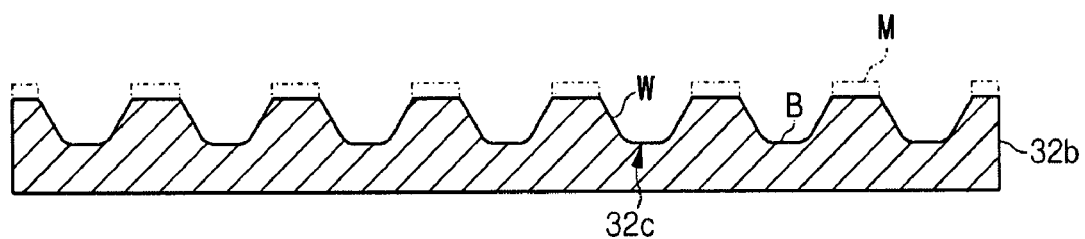

Referring to FIG. 6c, in step S30, flow channels 32c have been formed from the channel pattern 32p. For the flow channels, the joints between the bottom portion B and each of the wall portions W are rounded as shown in FIG. 6b. For this step, the mask pattern M is used as it is. The flow channel 32c is formed in step S30, such that the rounded joints have radii of curvature ranging from 10 to 20 μm, and the angle formed by the bottom portion B and each wall portion W forms an obtuse angle ranging, for example, from 120° to 130°.

Figure 6D:
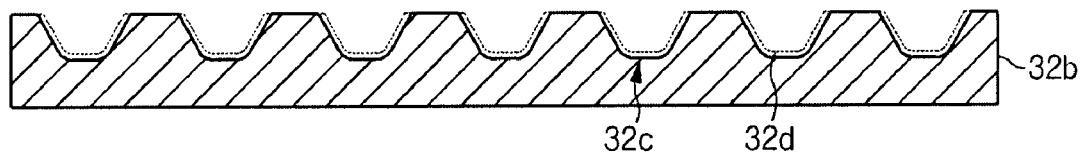

Referring to FIG. 6d, in step S40, a support layer 32d made of alumina ($Al_2O_3$), silica ($SiO_2$), or titania ($TiO_2$) is formed on the surface of the flow channel 32c using a known sol-gel method.

Figure 6E:
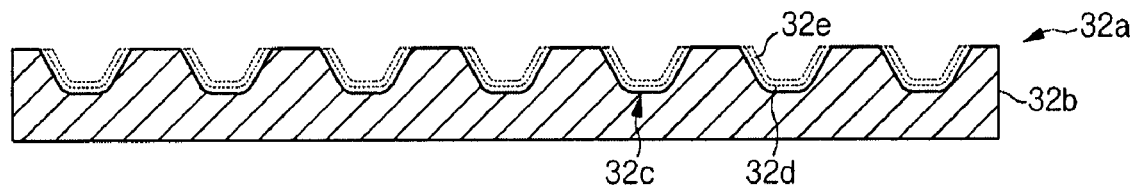
Figure 7C:
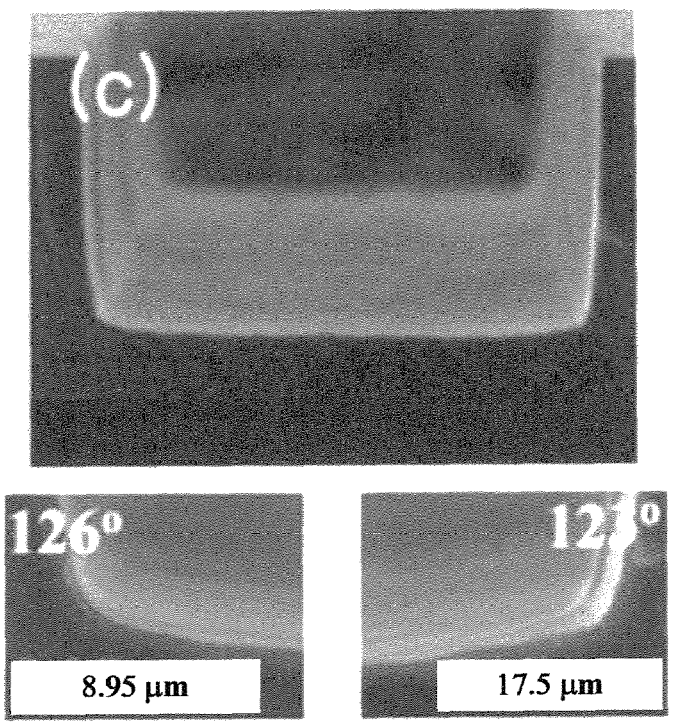
Figure 7D:
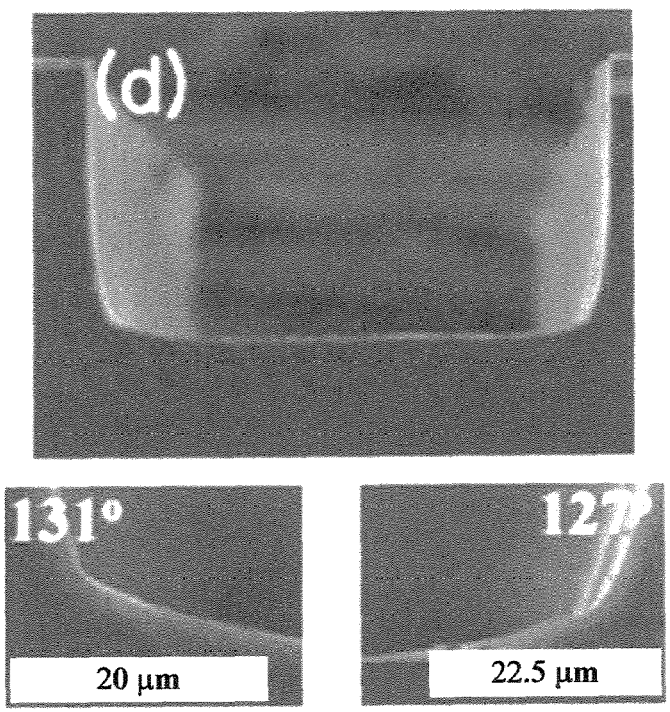
Figure 7E:
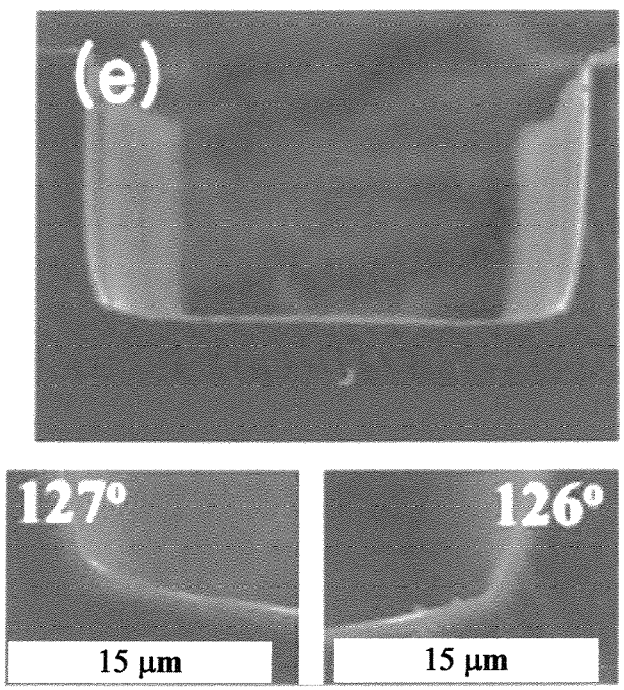
Figure 7F:
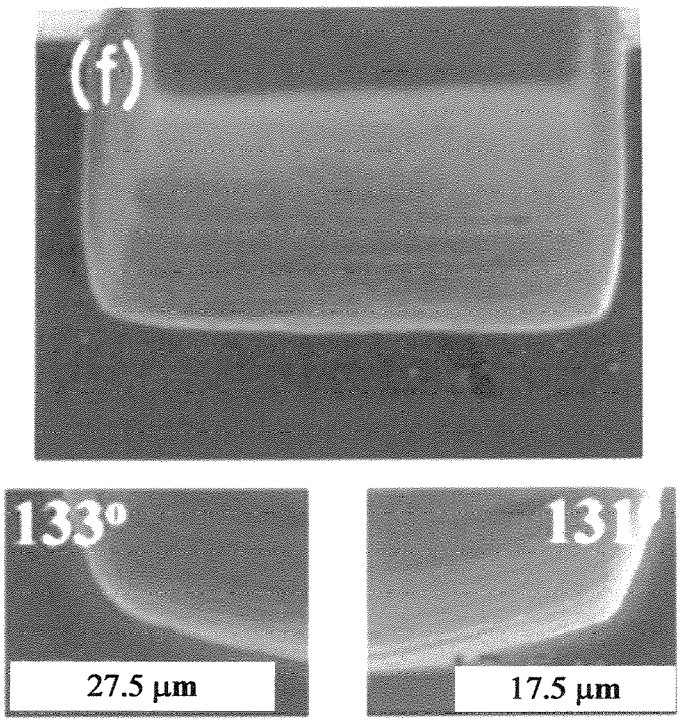

Referring to FIG. 6e, in step S50, a catalyst layer 32e is formed on the support layer 32d also using the sol-gel method.

As a result, the reaction substrate 32a according to the present invention is manufactured through a series of processes described above.

The embodiment of the present invention can be understood more clearly in conjunction with a comparative example described below as an example of the method of manufacturing a reaction substrate.

EXAMPLE

A silicon (Si) substrate was prepared with a mask for defining a channel pattern. Then, an anisotropic etching process was performed on the upper surface of the substrate body at a temperature of 80° C. for 2 hours by using a 30 wt % KOH solution. A channel pattern of which the bottom portion and the wall portions form right angles was formed on the upper surface of the substrate body through the anisotropic etching process. Next, an isotropic etching process was performed on the channel pattern at room temperature for 0.5 to 4 minutes by using an etchant obtained by mixing NF, $H_2O$, and $HNO_3$ at a ratio of 1:1:8. As a result, a plurality of flow channels were formed such that the joints between the bottom portion and the wall portions of each flow channel are rounded and the angles between the bottom portion and the wall portions form obtuse angles. Thereafter, by using aluminum isopropoxide as a precursor and using a 0.07 mol HCL peptization agent and a 3 g/100 mol PVA (PolyVinyl Alcohol) stabilization agent, support layers made of alumina ($Al_2O_3$) were formed on the surface of each flow channel at a temperature of 90° C. for 3 hours using a sol-gel method. Next, a catalyst layer was formed on each support layer using the sol-gel method.

Comparative Example

A silicon (Si) substrate was prepared with a mask pattern forming a channel pattern. Then, an anisotropic etching process was performed on the upper surface of the substrate body at a temperature of 80° C. for 2 hours by using a 30 wt % KOH solution. As a result, a plurality of flow channels were formed with the bottom portion and the wall portions of each flow channel forming right angles. Next, a support layer and a catalyst layer were formed in each flow channel.

FIGS. 7a to 7g are partially-enlarged photographs illustrating the reaction substrate manufactured according to the Example. As can be seen from the figure, when forming flow channels with rounded joints between the bottom portion and the wall portions having radii of curvature ranging from 10 to 20 μm, and angles between the bottom portion and the wall portions ranging from 120° to 130°, the support layers neither peel nor loosen from the joints between the bottom portion and the wall portions.

Figure 8B:
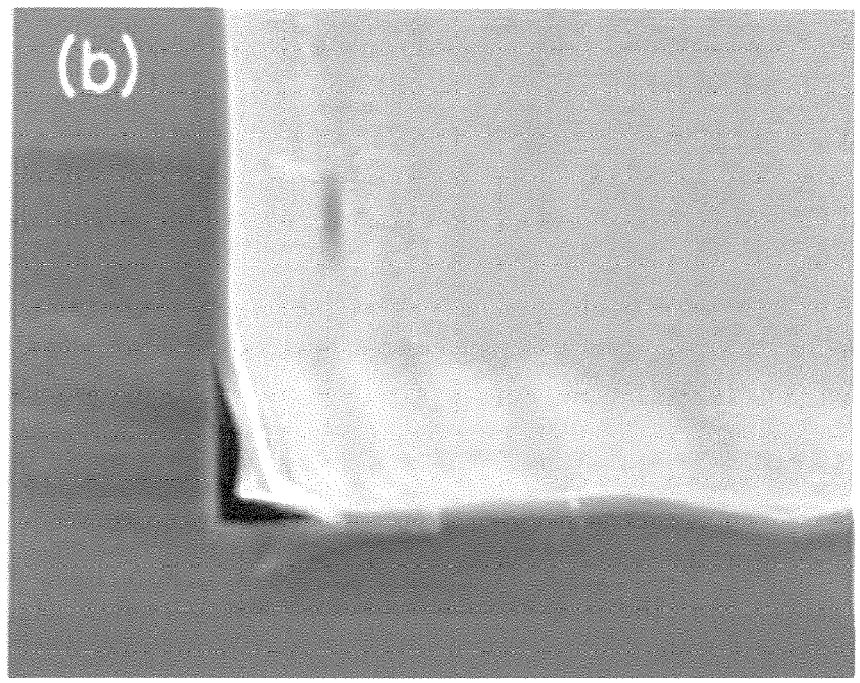
Figure 8C:
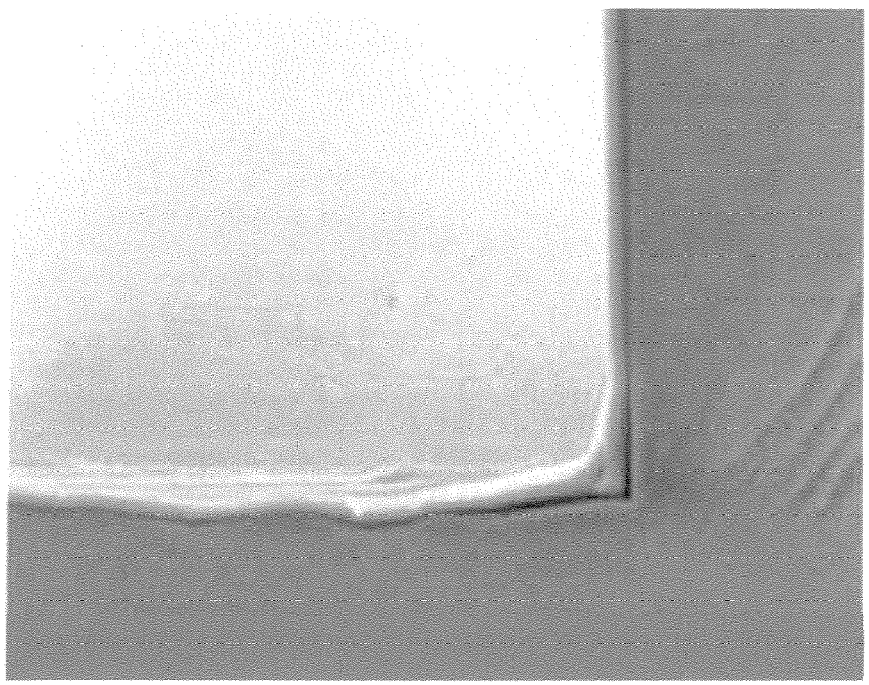

FIGS. 8a to 8c are partially-enlarged photographs illustrating the reaction substrate manufactured according to the Comparative Example. As can be seen from the figure, when forming the flow channels of which the joints between the bottom portion and the wall portions of each flow channel form right angles, the surface tension acting on the support layer at the time of gelation does not act in the directions perpendicular to the bottom portion and the wall portions, so that the support layer peels or loosens from the joints between the bottom portion and the wall portions.

Therefore, in the reaction substrate for a reformer according to the Example, by forming flow channels such that the joints between the bottom portion and the wall portions are rounded and the angles between the bottom portion and the wall portions are obtuse, it is possible to prevent peeling of the support layer from the joint between the bottom portion and the wall portions in the course of forming and baking the support layer on the surface of each flow channel. Since the surface tension acting on the support layer at the time of gelation of the support layer acts in the angle direction in contact with the joints between the bottom portion and the wall portions, the support layer does not peel or loosen from the joints.

Figure 9:
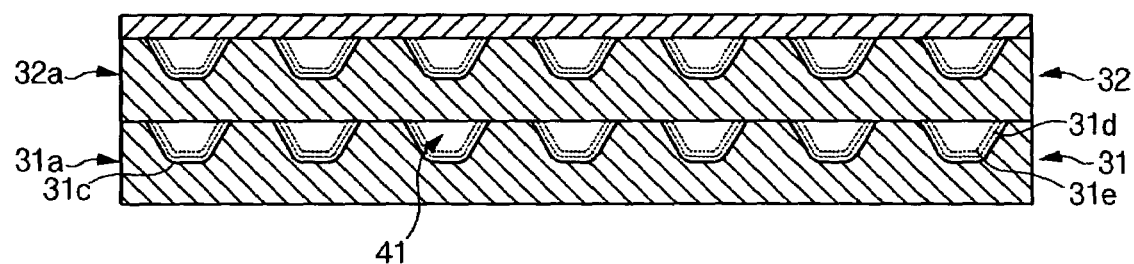
FIG. 9 is a cross-sectional view illustrating a structure of a reformer according to another embodiment of the present invention.

FIG. 9 is a cross-sectional view illustrating a structure of a reformer according to another embodiment of the present invention.

Referring to the figure, the reformer 30A according to the present embodiment includes a heat source unit 31 of a plate type similar to the reforming unit 32 described in the aforementioned embodiment.

The heat source unit 31 generates thermal energy having a predetermined temperature range through an oxidation reaction between fuel and air, and supplies the thermal energy to the reforming unit 32 which is the same as was described previously.

In the present embodiment, the heat source unit 31 includes a second reaction substrate 31a closely disposed to the first reaction substrate 32a of the reforming unit 32.

Specifically, the second reaction substrate 31a is formed with a size corresponding to the first reaction substrate 32a, and is closely disposed on the lower surface of the first reaction substrate 32a as shown in the figure. The second reaction substrate 31a is similar in configuration to the first reaction substrate in that it comprises a plurality of flow channel 31c allowing fuel and air to flow, a support layer 31d formed on the surface of the flow channel 31c, and a catalyst layer 31e formed on the support layer 31d. Here, the catalyst layer 31e is made of a known catalytic material for promoting the oxidation reaction between fuel and air.

A portion of the second reaction substrate 31a other than the flow channel 31c comes in close contact with the lower surface of the first reaction substrate 32a and is bonded to the first reaction substrate 32a with known bonding means.

Therefore, in the heat source unit 31 according to the present embodiment, since the second reaction substrate 31a is closely disposed on one surface of the first reaction substrate 32a, a flow passage 41 of fuel and air can be formed with the flow channel 31c.

In the reformer 30A according to the present embodiment having the above-mentioned structure, when fuel and air are supplied to the flow passage 41 of the heat source unit 31 at the time of operation of the fuel cell system, the heat source unit 31 generates thermal energy having a predetermined temperature range through the oxidation reaction between the fuel and the air.

In the present embodiment, since the first reaction substrate 32a of the reforming unit 32 and the second substrate 31a of the heat source unit 31 are disposed in close contact with each other, the reforming unit 32 generates hydrogen through the reformation reaction of the fuel using the thermal energy from the heat source unit 31.

For the embodiment of reformer 30A, the method of manufacturing the second reaction substrate 31a is identical to that of the aforementioned embodiment and a detailed descriptions is omitted.

Figure 10:
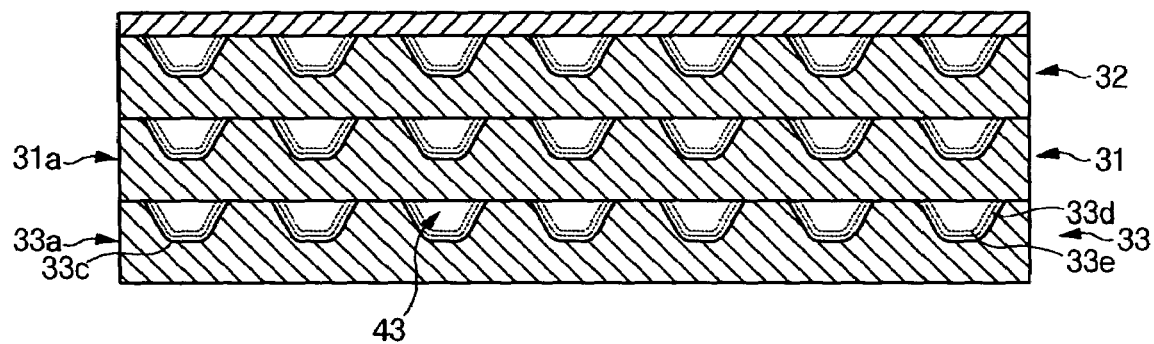
FIG. 10 is a cross-sectional view illustrating a structure of a reformer according to another embodiment of the present invention.

FIG. 10 is a cross-sectional view illustrating a structure of a reformer according to still another embodiment of the present invention.

Referring to the figure, the reformer 30B according to the present embodiment includes a carbon monoxide reducing unit 33 of a plate type disposed in close contact with the heat source unit 31 described in the aforementioned embodiments, and has a stacked structure with a reforming unit 32 as described above, a heat source unit 31 as described above, and a carbon monoxide reducing unit 33.

The carbon monoxide reducing unit 33 reduces the concentration of carbon monoxide contained in the hydrogen gas by using a water-gas shift (WGS) catalytic reaction or a preferential CO oxidation (PROX) catalytic reaction of the hydrogen gas generated from the reforming unit 32.

In the present embodiment, the carbon monoxide reducing unit 33 performs the preferential CO oxidation reaction of the hydrogen gas and includes a third reaction substrate 33a disposed in close contact with the second reaction substrate 31a of the heat source unit 31.

Specifically, the third reaction substrate 33a is formed with a size corresponding to the second reaction substrate 31a and is disposed in close contact with the lower surface of the second reaction substrate 31a as shown in the figure. The third reaction substrate 33a comprises a plurality of flow channels 33c allowing hydrogen gas and air for the preferential CO oxidation reaction to flow, a support layer 33d formed on the surface of each flow channel 33c, and a catalyst layer 33e formed on the support layer 33d. Here, the catalyst layer 33e is made of a known catalytic material for promoting the preferential CO oxidation reaction between carbon monoxide contained in the hydrogen gas and oxygen contained in the air.

A portion of the third reaction substrate 33a other than the flow channel 33c comes in close contact with the lower surface of the second reaction substrate 31a and is bonded to the second reaction substrate 31a with known bonding means. Therefore, since the third reaction substrate 33a is disposed in close contact with one surface of the second reaction substrate 31a, the carbon monoxide reducing unit 33 according to the present embodiment can form a flow passage 43 for the hydrogen gas and the air with the flow channel 33c.

In the reformer 30B according to the present embodiment having the above-mentioned structure, the hydrogen gas generated from the reforming unit 32 and the air are supplied to the flow passage 43 of the carbon monoxide reducing unit 33 at the time of operation of the fuel cell system. Then, the carbon monoxide reducing unit 33 causes the preferential CO oxidation reaction between carbon monoxide contained in the hydrogen gas and oxygen contained in the air and discharges hydrogen gas in which the concentration of carbon monoxide is reduced.

The other structure of the reformer 30B according to the present embodiment and a method of manufacturing the third reaction substrate 33a are identical to the aforementioned embodiments and a detailed description is omitted.

According to the present invention described above, by stacking the reaction substrates to form the reformer, the thermal energy necessary for the respective reaction units of the reformer can be delivered rapidly. Therefore, it is possible to enhance the thermal efficiency of the reformer and the performance of the whole fuel cell system.

In addition, according to the present invention, by forming the reformer with a simple structure of a plate type, it is possible to make the total size of the fuel cell system compact.

In addition, according to the present invention, in manufacturing the reaction substrates, by forming the flow channels using an isotropic etching process and an anisotropic etching process such that the joints between a bottom portion and the wall portions are rounded and the angles between the bottom portion and the wall portions are obtuse, it is possible to improve the adhesive ability of the support layer for supporting the catalyst layer and thus to prevent the support layer from being peeled from the joints between the bottom portion and the wall portions.

Although the exemplary embodiments of the present invention have been described, the present invention is not limited to the exemplary embodiments, but may be modified in various forms without departing from the scope of the appended claims, the detailed description, and the accompanying drawings of the present invention. Therefore, it is natural that such modifications belong to the scope of the present invention.

What is claimed is:

1. A reformer for a fuel cell system, the reformer comprising a reforming unit comprising:
   a reaction substrate defining a plurality of flow channels, each flow channel defined by a generally planar bottom portion and a pair of corresponding generally planar wall portions, wherein the intersection of the bottom portion and each corresponding wall portion defines a rounded joint having a radius of curvature ranging from 10 to 20 μm; and catalyst layers formed in a plurality of the flow channels.

2. The reformer for a fuel cell system of claim 1, wherein the bottom portion and each corresponding wall portion defines an obtuse angle.

3. The reformer for a fuel cell system of claim 2, wherein the obtuse angles range from 120 to 130°.

4. The reformer for a fuel cell system of claim 1, wherein a plurality of ribs protruding from a surface of the reaction substrate define the plurality of flow channels.

5. The reformer for a fuel cell system of claim 4, further comprising a cover plate disposed in close contact with one surface of the reaction substrate.

6. The reformer of a fuel cell system of claim 1, wherein a support layer is provided between each flow channel and each catalyst layer.

7. The reformer of a fuel cell system of claim 6, wherein the reaction substrate comprises a material selected from the group consisting of silicon, glass, and stainless steel.

8. The reformer of a fuel cell system of claim 7, wherein the support layer comprises a material selected from the group consisting of alumina, silica, and titania.

9. The reformer of a fuel cell system of claim 1 wherein the reaction substrate is a first reaction substrate, the plurality of flow channels are a first plurality of flow channels, and the catalyst layer is a reforming catalyst layer, the reformer further comprising a heat source unit adjacent the reforming unit, the heat source unit comprising:
   a second reaction substrate defining a second plurality of flow channels; and
   a heat source catalyst layer formed in at least one of the second plurality of flow channels.

10. The reformer of a fuel cell system of claim 9, further comprising a carbon monoxide reducing unit comprising:
    a third reaction substrate defining a third plurality of flow channels; and
    a carbon monoxide reducing catalyst layer formed in at least one of the third plurality of flow channels.

11. The reformer of a fuel cell system of claim 10, wherein the first reaction substrate, the second reaction substrate and the third reaction substrate are stacked adjacent one another and a cover plate is disposed in close contact with the uppermost reaction substrate.

* * * * *